United States Patent [19]

Brunner

[11] 4,202,172
[45] May 13, 1980

[54] BOOST SURVIVABLE RAMJET ELEMENTS

[75] Inventor: Dietrich W. Brunner, Kent, Wash.

[73] Assignee: The Boeing Company, Seattle, Wash.

[21] Appl. No.: 662,983

[22] Filed: Mar. 1, 1976

[51] Int. Cl.² .............................................. F02K 7/10
[52] U.S. Cl. ...................................... 60/245; 60/250; 60/258; 60/270 R
[58] Field of Search ............... 60/270 S, 270 R, 225, 60/245, 250, 253, 254, 39.47; 60/251, 258

[56] References Cited

U.S. PATENT DOCUMENTS

| | | | |
|---|---|---|---|
| 2,912,820 | 11/1959 | Whitmore | 60/225 |
| 3,332,243 | 7/1967 | Wilson | 60/253 |
| 3,354,647 | 11/1967 | Aycock | 60/250 |
| 3,482,403 | 12/1969 | Polk, Jr. | 60/245 |
| 3,803,837 | 4/1974 | Curran | 60/245 |
| 3,940,067 | 2/1976 | Cherry et al. | 60/253 |

Primary Examiner—Stephen C. Bentley
Attorney, Agent, or Firm—Mark J. Zovko, Jr.; Kenneth W. Thomas; J. Peter Mohn

[57] ABSTRACT

Protectors for certain elements such as fuel injectors and flameholders used in conjunction with the ramjet phase of an integral rocket ramjet.

In the preferred embodiment slip-on caps of a high temperature material such as graphite are used to protect the fuel injectors and flameholders. The caps are installed and the solid boost propellant packaged about them. Following boost burnout the initial fuel pressurization for transition to ramjet operation would remove the caps allowing operation in a ramjet mode.

1 Claim, 3 Drawing Figures

4,202,172

BOOST SURVIVABLE RAMJET ELEMENTS

BACKGROUND OF THE INVENTION

1. Field of the Invention

This invention relates in general to rocket ramjet engines and more particularly to boost phase survivable fuel injectors and flameholders for use with rocket ramjet engine.

2. Discussion of the Prior Art

It is already known to provide an engine which comprises a rocket engine and ramjet engine having a common combustion chamber for both types of operation. Conventional and integral rocket ramjet engines commonly use two types of fuel, each during a different phase of operation. In the initial rocket operation or boost phase, a solid propellant charge which contains an oxidizing material burns upon ignition by an igniting means. Exhaust gases pass through a jet nozzle and propel the rocket with a large amount of thrust. The amount of thrust depends upon several factors such as nozzle design, propellant type, propellant density, and the surface area of the propellant exposed to burning. The solid propellant charge which is generally located in the aft end of the rocket may have an axial bore which exposes more than just the end surface area of the charge to burning and therefore yields more thrust. During the rocket operation, or boost stage, the solid propellant does not need rammed air for proper operation. The solid propellant contains enough oxidizing material in itself to support combustion.

Upon exhaustion of the solid propellant, the boost phase is ended and the ramjet operation or sustain phase begins. During the sustain phase, the projectile is propelled by a fuel charge which is not capable of burning without an outside source of oxygen. After the boost phase is completed, therefore, air is rammed into the rocket's combustion chamber through inlet ducts or ports. Initially the ports are closed during the boost phase. The rammed air admitted to the combustion chamber reacts with the fuel charge to sustain the rocket in flight. The fuel charge, normally a liquid or a slurry, will be injected into the stream of rammed air. The air and fuel combust, and the exhaust gases pass through a nozzle, providing thrust for sustaining the projectile in flight.

One efficient packaging design for integral rocket-ramjets is described in Ser. No. 582,956, Brousseau, et.al., Loaded Air Duct Integral Rocket Ramjet, filed June 2, 1975. The rammed air inlet duct is used to initially package a portion of boost propellant. Ramjet operation subsequent to the boost burnout requires that certain elements such as flameholders and some fuel injectors be located physically within the inlet duct at or just upstream of the entrance to the combustion chamber. These elements are fixed position devices and require physical protection from the internal boost phase environment to permit them to function satisfactorily in the subsequent ramjet mode.

The prior art discloses the concept of having an element such as a fuel injector within a body of solid boost propellant which is cast thereabout as shown in U.S. Pat. No. 3,325,998; and U.S. Pat. No. 3,482,403. No protective means for these elements are disclosed however.

SUMMARY OF THE INVENTION

In a rocket-ramjet projectile, a solid boost propellant is usually used during the rocket phase, and a liquid or slurry feed during the ramjet phase. The solid boost propellant may be disposed in a chamber within the projectile serving as an inlet duct for a rammed air stream and a combustor once the solid boost propellant is exhausted. The invention comprises providing high temperature protective means for elements exposed to rocket phase environment which elements must subsequently be used during the ramjet phase. The rocket phase environment is high temperature and abrasive. High energy propellants normally incorporate metal particles such as aluminum which are carried along by the propellant exhaust products. Two such elements exposed to this environment are fuel injectors which inject the liquid or slurry fuel into the rammed air stream after the rocket phase, and flameholders which produce a stabilized flame front in the combustor during ramjet operation. The protective means is preferably a slip on cap or coating made of a high temperature material such as graphite. The fuel injectors are either imbedded within or located in proximity to the solid boost propellant, and are surrounded with the graphite slip on cap during the rocket phase. After burnout of the solid boost propellant, the protective caps are removed by the fuel pressure and are carried downstream (aft) by the high pressure from the rammed air stream, and the fuel injector functions normally injecting liquid or slurry fuel into the rammed airstream. The flameholders would be protected in a similar manner. As an alternative to slip-on caps, the elements may be coated.

It is an object of this invention to provide a means for protecting exposed ramjet elements in an integral rocket ramjet from the boost environment.

Another object of this invention is to allow ramjet fuel injectors and flameholders to be fixed position devices in an integral rocket ramjet.

DESCRIPTION OF THE PREFERRED EMBODIMENT

Figure 1:
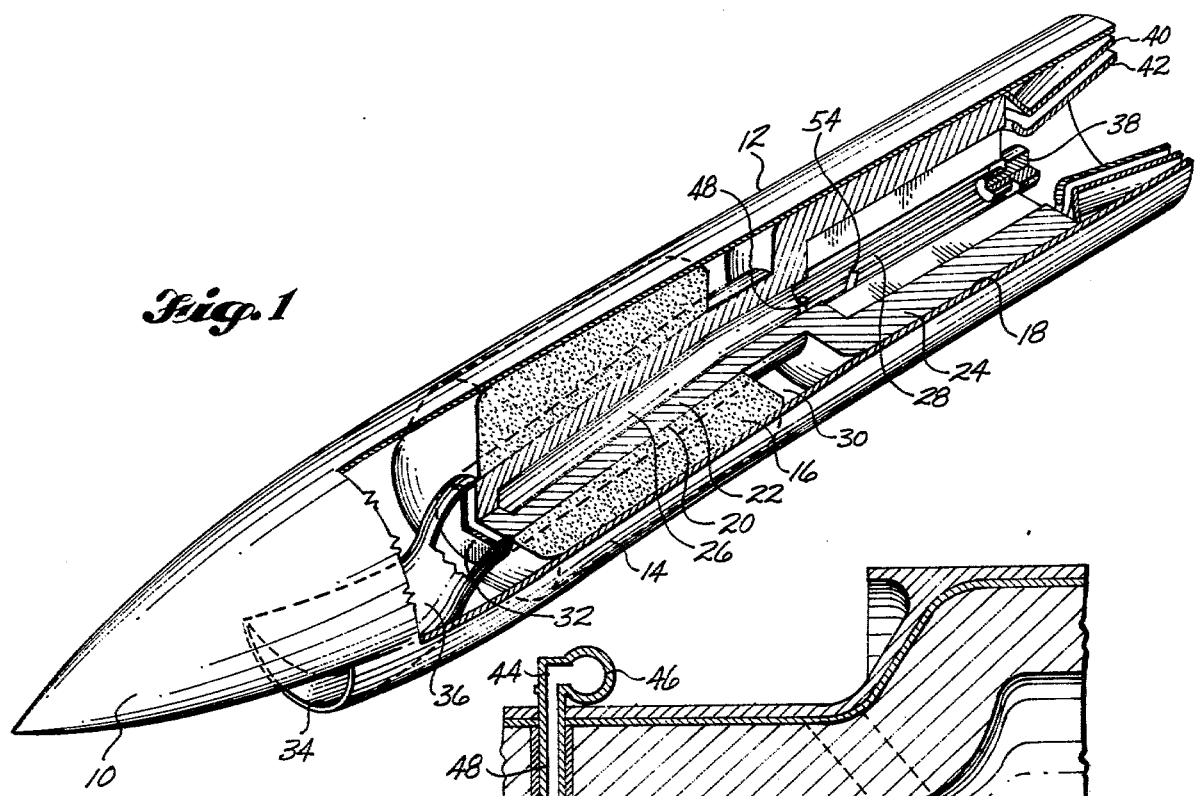
FIG. 1 is an isometric view partially in section of a rocket-ramjet projectile.

For illustrative purposes, the invention will be described assuming the rocket-ramjet configuration is as shown in FIG. 1. The invention will readily apply to other rocket ramjet configurations having a solid boost propellant and a fluid fuel. Referring now to FIG. 1, a rocket ramjet projectile generally designated as 10 is shown. Projectile 10 has an elongated housing 12 which houses a payload (not shown), a fuel tank 14 containing a fluid fuel 16, and an aft boost chamber 18. Fluid fuel 16 may be either a liquid or a slurry. A forward boost chamber 20 is disposed through the fuel tank 14. The forward boost chamber 20 and aft boost chamber 18 contain a forward solid boost propellant grain 22 and an aft solid boost propellant grain 24 used during the boost phase. The two grains 22 and 24 need not be of the same propellant formulation. A bore 26 runs through forward boost propellant grain 22, and the aft boost propellant grain contains an axial bore 28 to expose a greater surface area to combustion.

An accessory section 30 is located in the space between the fuel tank 14 and the aft boost chamber 18 and can be used to house various instruments and controls. Forward boost chamber 20 has a dome cover 32 on its front end. An inlet duct 34 is connected with forward boost chamber 20 through transition section 36. A boost igniter 38 is positioned adjacent to the rear end of axial bore 28 in the aft boost propellant grain 24. Ramjet nozzle 40 is disposed at the aft end of elongated housing 12 and is used during the sustain phase. Within ramjet nozzle 40, a smaller ejectable boost nozzle 42 is disposed for use during the boost phase.

Figure 2:
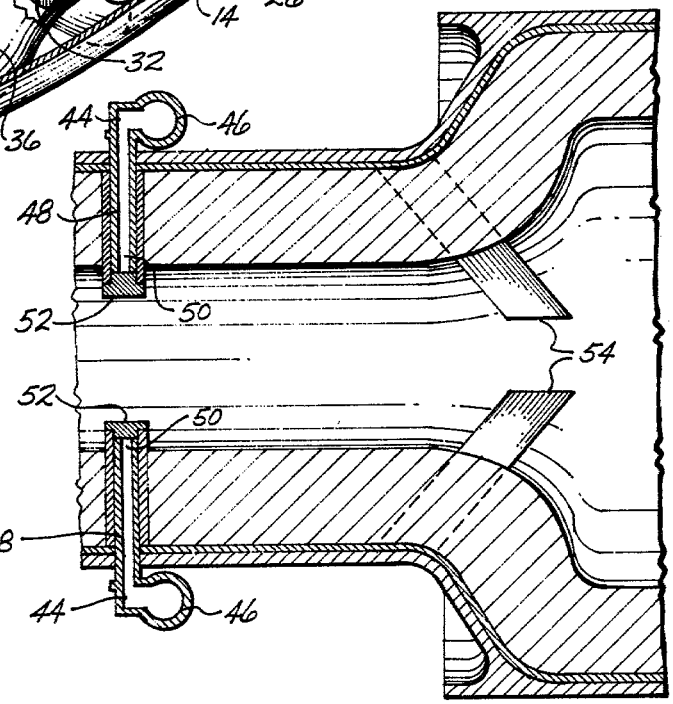
FIG. 2 is a horizontal sectioned view of the combustor entrance of a rocket ramjet projectile.
Figure 3:
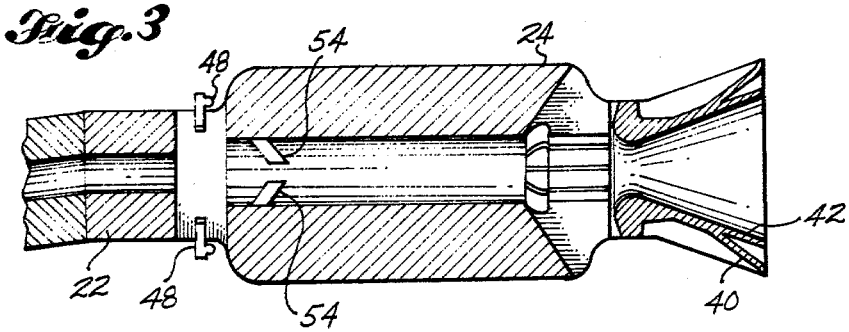
FIG. 3 is a horizontal sectioned view of air combustor entrance with space allocated for non-imbedded injectors.

Referring now to FIG. 2, a representative fuel injector generally designated as 44 is shown. The fuel injector is comprised of a manifold 46 and a strut 48 with injecting means 50 at its tip. Injecting means 50 may also be located on the circumference of the strut 48. The fuel injector 44 is either imbedded partially or totally in the forward boost propellant grain 22 as shown in FIG. 2, or in proximity to but not imbedded in the forward boost propellant grain 22 as shown best in FIG. 3. The fuel injector 44 communicates, in either case, with fluid fuel tank 14. As shown the injecting means 50 protrudes into the axial bore 26 of propellant grain 22. The injectors 44 are preferably located near the entrance of chamber 18 in position which enhance the combustion process. A slip-on cap 52 made of a suitable high temperature material such as graphite would cover strut 48. The cap 52 protects each fuel injector 44 from the hostile environment during the boost phase. A slip-on cap, would be a preferred means of protecting strut 48, however, a surface coating may also be used. The cap 52 would be installed over strut 48 prior to adding the forward boost propellant grain 22. The forward boost propellant 22 is then cast about the strut 48 and cap 52 to partially or totally enclose them, or is positioned totally upstream of the location of the strut 48 and cap 52.

Flameholders which are located downstream of a fuel injector can also be covered with a slip-on cap of a high temperature material. FIG. 2 shows a V-gutter type flameholder 54 which is located slightly downstream of injector 44. The function of flameholder 54 is to provide a zone of mixing of the fluid fuel with the rammed air stream to assure combustion stability and to provide a high utilization of the fuel energy.

In operation, the projectile is ignited by a suitable signal to igniter 38. Igniter 38 ignites forward and aft boost propellant grains 22 and 24, respectively. Both grains contain oxidizing material and rapidly combust, thereby boosting projectile 10 by the emission of exhaust gases (not shown) through boost nozzle 42. The forward boost propellant grain 22 is shaped to burn progressively. Progressive burning means that the burning surface area continually increases during the boost phase until substantially complete burnout. Initially the surface area exposed to burning is along the inner surface of bore 26 of forward boost propellant grain 22. As combustion continues the diameter of bore 26 increases, and therefore the surface area exposed to burning increases also. The thrust delivered to the projectile is directly proportional to the burning surface area of the propellant grain. The aft boost propellant grain 24, contrary to the forward boost propellant grain 22, is shaped to burn regressively. Regressive burning means that a continually decreasing surface area is exposed to burning after ignition. The thrust contribution delivered the projectile by the aft propellant grain 24 continually decreases with time until substantial burnout is completed.

Both the forward and aft boost propellant grains 22 and 24 will continue to burn and deliver thrust to the projectile until respective exhaustion of the grains. At this point in time, the boost phase terminates. The forward boost chamber 20 and aft boost chamber 18 are emptied of solid propellant, boost nozzle 42 is ejected, and cover 32 opens or ablates due to the pressure differential across its surface. Forward boost chamber 20 now serves as a rammed air transport duct, also designated as 20, which receives rammed air from chin inlet duct 34 through transition area 36. The rammed air passes into aft boost chamber 18 which now serves as a ramjet combustor, also designated as 18. Caps 52 covering struts 44 are ablated by the initial fuel pressurization for transition to ramjet mode. Caps covering flameholders 54 would also ablate due to aerodynamic forces created by ramjet air flow.

The fluid fuel 16 from fuel tank 14 is injected into the ramjet combustor 18 by injectors 44 (FIG. 2) and combines with the rammed air flowing through the rammed air transport duct 20. The fluid fuel 16 and the rammed air combust and the exhaust gases pass through ramjet nozzle 40, delivering thrust to the projectile to sustain its flight. The projectile will continue in flight until the fluid fuel 16 is exhausted or until collision with an external object occurs.

What is claimed is:

1. In a rocket-ramjet projectile, having a solid boost propellant for use during the rocket phase, and a ramjet fuel disposed in a fuel tank within the projectile during the ramjet phase, the solid boost propellant disposed in a chamber, the chamber functioning as a combustor once the solid boost propellant is exhausted, the combustion comprising:
   (a) injector means communicating with the ramjet fuel or injecting ramjet fuel into combustor after the solid boost propellant is exhausted;
   (b) flameholding means mounted to the projectile in the rammed air stream for producing a stabilized flame front in the combustor during ramjet operation;
   (c) a graphite slip-on cover associated with said injector means and said flameholding means for protecting said injecting means and flameholder means from high temperatures during the burning of the solid boost propellant, said graphite slip-on cover being removable after the substantial burnout of the solid boost propellant.

* * * * *